United States Patent
Byun

(10) Patent No.: US 9,266,492 B2
(45) Date of Patent: Feb. 23, 2016

(54) CURTAIN AIRBAG MODULE

(71) Applicant: AUTOLIV DEVELOPMENT AB, Vårgårda (SE)

(72) Inventor: Jong Ki Byun, Seoul (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/381,124

(22) PCT Filed: Feb. 19, 2013

(86) PCT No.: PCT/KR2013/001293
§ 371 (c)(1),
(2) Date: Aug. 26, 2014

(87) PCT Pub. No.: WO2013/133548
PCT Pub. Date: Sep. 12, 2013

(65) Prior Publication Data
US 2015/0021885 A1 Jan. 22, 2015

(30) Foreign Application Priority Data
Mar. 9, 2012 (KR) .................. 10-2012-0024570

(51) Int. Cl.
| | |
|---|---|
| *B60R 21/232* | (2011.01) |
| *B60R 21/213* | (2011.01) |
| *B60R 21/201* | (2011.01) |
| *B60R 21/16* | (2006.01) |
| *B60R 21/00* | (2006.01) |

(52) U.S. Cl.
CPC ............. *B60R 21/232* (2013.01); *B60R 21/201* (2013.01); *B60R 21/213* (2013.01); *B60R 2021/0006* (2013.01); *B60R 2021/161* (2013.01)

(58) Field of Classification Search
CPC .. B60R 21/213; B60R 21/214; B60R 21/232; B60R 2021/161; B60R 2021/0006
USPC .......................................... 280/730.2, 728.2
See application file for complete search history.

(56) References Cited

U.S. PATENT DOCUMENTS

| | | | |
|---|---|---|---|
| 6,254,123 B1 * | 7/2001 | Urushi et al. .............. | 280/730.2 |
| 7,597,350 B2 | 10/2009 | Lim | |
| 7,731,224 B2 * | 6/2010 | Enriquez et al. ........... | 280/730.2 |
| 7,976,055 B2 | 7/2011 | Son | |

(Continued)

FOREIGN PATENT DOCUMENTS

| | | |
|---|---|---|
| KR | 10-0831504 B1 | 5/2008 |
| KR | 2009-0066396 A | 6/2009 |
| KR | 10-0999680 B1 | 12/2010 |

OTHER PUBLICATIONS

International Search Report and Written Opinion of the ISA, ISA/KR, Daejeon, mailed Jun. 14, 2013.

*Primary Examiner* — Keith Frisby
(74) *Attorney, Agent, or Firm* — Harness, Dickey & Pierce, P.L.C.

(57) ABSTRACT

Disclosed is a curtain airbag module including a curtain airbag cushion, an inflator of supplying and inflating gas into the curtain airbag cushion, and a lamp bracket fixed on a vehicle panel to support the curtain airbag cushion which is integrally provided with a lamp pattern to deploy the curtain airbag cushion into a vehicle without deploying the curtain airbag cushion into a pillar trim of a vehicle in the deployment of the curtain airbag cushion by driving the inflator. The lamp pattern wraps up at least a portion of the folded curtain airbag cushion. The lamp pattern initially wrapping up the folded curtain airbag cushion guides the curtain airbag cushion to the interior of the vehicle when the curtain airbag cushion is deployed, thereby preventing the curtain airbag cushion from being inserted into the pillar trim, so that the curtain airbag cushion is stably deployed.

8 Claims, 3 Drawing Sheets

(56) References Cited

U.S. PATENT DOCUMENTS

| | | | |
|---|---|---|---|
| 2002/0195803 A1* | 12/2002 | Terbu et al. | 280/730.2 |
| 2006/0061075 A1* | 3/2006 | Aoki et al. | 280/730.2 |
| 2007/0040368 A1 | 2/2007 | Manley | |
| 2008/0106082 A1 | 5/2008 | Choi | |

* cited by examiner

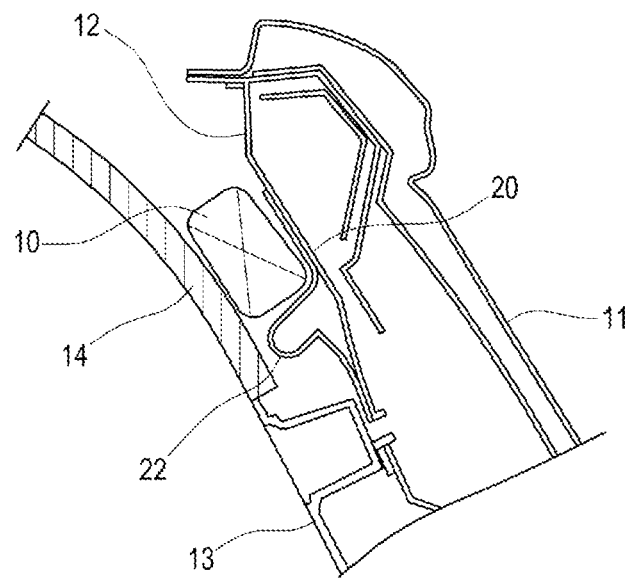
FIG. 1 - PRIOR ART
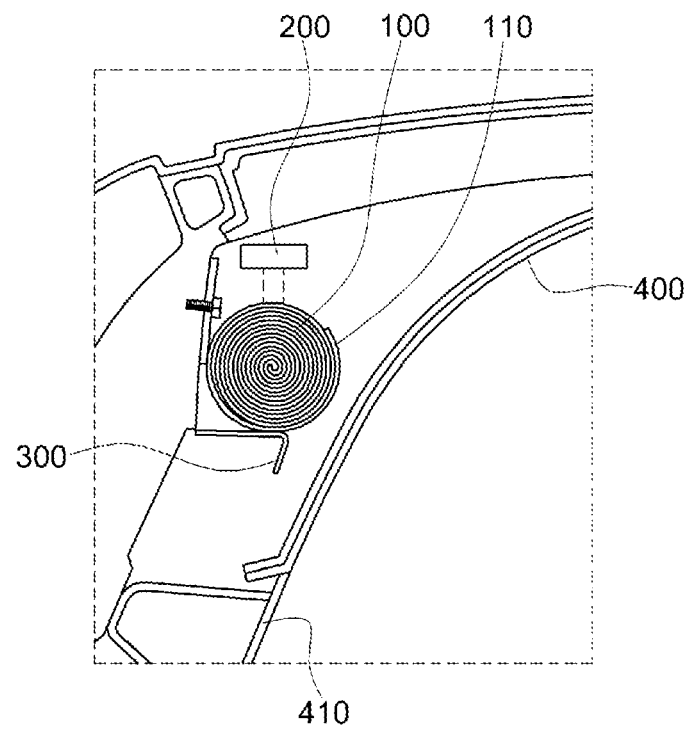
FIG. 2

CURTAIN AIRBAG MODULE

CROSS-REFERENCE TO RELATED APPLICATIONS

This application is a 371 U.S. National Stage of International Application No. PCT/KR2013/001293, filed Feb. 19, 2013, which claims priority to Korean Patent Application No. 10-2012-0024570, filed Mar. 9, 2012. The disclosures of the above applications are incorporated herein by reference.

TECHNICAL FIELD

The present invention relates to a curtain airbag module. In more particular, the present invention relates to a curtain airbag module in which a curtain airbag cushion can be prevented from being inserted into the inside of a pillar trim of a vehicle when the curtain airbag cushion is deployed, so that the curtain airbag cushion can be stably deployed. The curtain airbag module can be realized in a compact size, so that the curtain airbag module can be easily installed, and the manufacturing cost thereof can be reduced.

BACKGROUND

In general, vehicle airbag modules are safety devices of injecting compressed gas into an airbag cushion according to a signal of a sensor of detecting impact strength upon collision accident to rapidly inflate the airbag cushion, so that an occupant can be protected.

Among the airbag modules, there is an airbag module installed along the whole lateral side of a roof liner of a vehicle to protect an occupant from impact applied to a side portion of the vehicle, which is generally called a curtain airbag module.

The curtain airbag module starts from a roof beam constituting a roof of the vehicle and extends from a C pillar to an A pillar through a B pillar along the lateral side of the vehicle.

FIG. 1 is a sectional view showing the installation state of a curtain airbag module according to the related art.

As shown in FIG. 1, according to the related art, upper and lower portions of a ramp bracket 20 of a roof side panel 11 are fixed onto a side rail part 12 so that a curtain airbag cushion 10 may be deployed on the side rail part 12 of the roof side panel 11. In addition, when the curtain airbag cushion 10 is deployed due to the side collision of the vehicle, a protrusion part 22 protrudes from the ramp bracket 20 to prevent the curtain airbag cushion 10 from being inserted between a vehicle body and a pillar trim 13.

Meanwhile, the curtain airbag cushion 10 is deployed while pushing a headlining 14 to the interior space of the vehicle upon vehicle collision. Since the protrusion part 22 of the ramp bracket 20 is inclined as shown in FIG. 1, the curtain airbag cushion 10 may be not effectively deployed.

In detail, a portion of the curtain airbag cushion 10, which is being deployed, is locked with the pillar trim 13 by the resistance of the head lining 14 or deployed in the state that the curtain airbag cushion 10 is inserted into the inside of the pillar trim 13, so that the curtain airbag cushion 10 is unstably deployed. Accordingly, the occupant may not be safely protected.

In order to complement the above problem, a technology capable of more stably deploying the curtain airbag cushion by modifying the structure of the ramp bracket has been developed and applied. However, according to the technology, as the structure of the ramp bracket is complicated, the manufacturing cost not only is increased, but the volume of the ramp bracket is increased, so that the ramp bracket may not be easily installed in the inner space of the head lining. In this case, the shape of the ramp bracket is deformed, so that the curtain airbag cushion may not be normally deployed.

SUMMARY

Accordingly, the present invention has been made keeping in mind the above problems occurring in the prior art, and an object of the present invention is to provide a curtain airbag module capable of preventing a curtain airbag cushion from being inserted into the inside of the pillar trim of the vehicle when the curtain airbag cushion is deployed so that the curtain airbag cushion can be stably deployed.

Another object of the present invention is to provide a curtain airbag module which can be realized in a compact size, so that the curtain airbag module cannot only be easily installed, but also the manufacturing cost can be reduced.

Objects of the present invention may not be limited to the above, and other objects of the present invention will be apparently comprehended by those skilled in the art when making reference to embodiments in the following description.

In order to accomplish the above objects, according to an aspect of the present invention, there is provided a curtain airbag module including a curtain airbag cushion, an inflator of supplying gas into the curtain airbag cushion to inflate the curtain airbag cushion, and a ramp bracket fixedly mounted on a vehicle panel to support the curtain airbag cushion, characterized in that the curtain airbag cushion is integrally provided with a ramp pattern to guide a deployment direction of the curtain airbag cushion to prevent the curtain airbag cushion from being deployed into a pillar trim of a vehicle when the curtain airbag cushion is deployed by driving the inflator, and the ramp pattern wraps up at least a portion of the curtain airbag cushion in a folded state.

According to another aspect of the present invention, there is provided a curtain airbag module including a curtain airbag cushion, an inflator of supplying gas into the curtain airbag cushion to inflate the curtain airbag cushion, and a ramp bracket fixedly mounted on a vehicle panel to support the curtain airbag cushion, characterized in that the curtain airbag cushion is integrally provided with a ramp pattern to guide a deployment direction of the curtain airbag cushion to prevent the curtain airbag cushion from being deployed into a pillar trim of a vehicle when the curtain airbag cushion is deployed by driving the inflator, the ramp pattern is formed simultaneously with the curtain airbag cushion when a weaving process is performed through an OPW scheme to fabricate the curtain airbag cushion, and the ramp pattern wraps up at least a portion of the curtain airbag cushion in a folded state.

The ramp pattern may include a fabric material a same as a fabric material of the curtain airbag cushion.

The ramp pattern may include a fabric material having strength superior to a fabric material of the curtain airbag cushion.

The ramp pattern may be subject to a taping treatment so that the curtain airbag cushion can be maintained in the folded state, and, when the curtain airbag cushion is deployed, the ramp pattern may be positioned between the curtain airbag cushion and the pillar trim of the vehicle due to a deployment pressure of the curtain airbag cushion to cover an upper portion of the pillar trim of the vehicle, thereby guiding deployment of the curtain airbag cushion into an interior space of the vehicle.

The curtain airbag module according to the embodiment of the present invention has following effects.

First, the ramp pattern initially wrapping up the folded curtain airbag cushion guides the inflation direction of the curtain airbag cushion to the interior of the vehicle when the curtain airbag cushion is deployed, thereby preventing the curtain airbag cushion from being inserted into the inside of the pillar trim, so that the curtain airbag cushion can be stably deployed.

Second, since the ramp pattern includes a fabric material of the same as that of the curtain airbag cushion and is formed simultaneously with the curtain airbag cushion when a weaving process is performed through an OPW scheme, the manufacturing cost can be reduced.

Third, the ramp pattern made of a fabric material wraps up the folded curtain airbag cushion to reduce the volume of the folded curtain airbag cushion, so that the curtain airbag cushion can be easily installed. In addition, the shape of the curtain airbag cushion can be prevented from being deformed as much as possible.

Effects of the present invention may not be limited to the above, and other objects of the present invention will be apparently comprehended by those skilled in the art when making reference to embodiments in the following description.

DESCRIPTION OF THE DRAWINGS

FIG. 1 is a sectional view showing the installation state of a curtain airbag module according to the related art;

FIG. 2 is a sectional view showing the installation state of a curtain airbag module according to the embodiment of the present invention;

DETAILED DESCRIPTION

Figure 3:
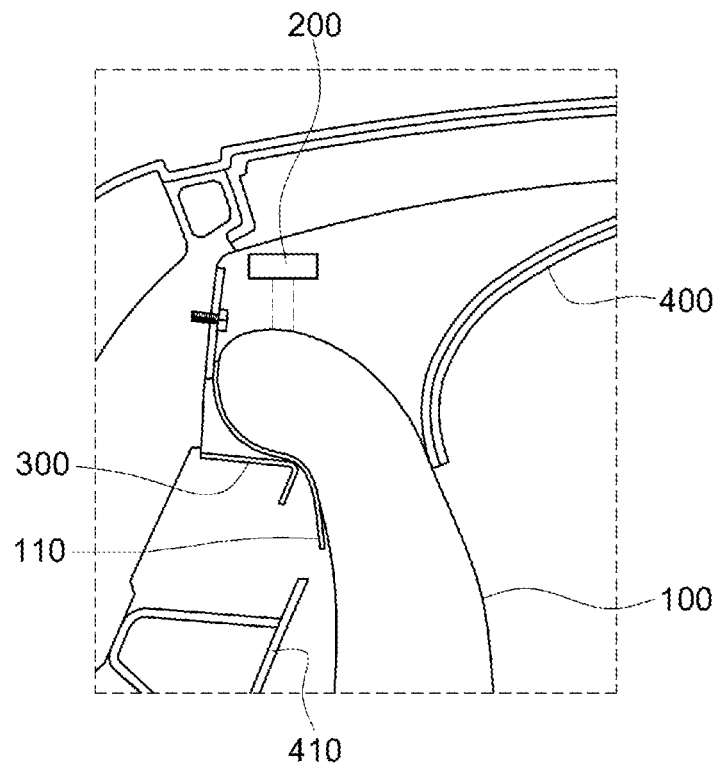
FIG. 3 is a sectional view showing the installation state of a curtain airbag cushion of FIG. 2.

Hereinafter, exemplary embodiments of the present invention will be described in detail with reference to accompanying drawings. However, the present invention is not limited to the following embodiments, but various modifications may be realized. The present embodiments are provided to make the disclosure of the present invention perfect and to make those skilled in the art perfectly comprehend the scope of the present invention. The same reference numerals will be used to refer to the same elements.

Figure 4:
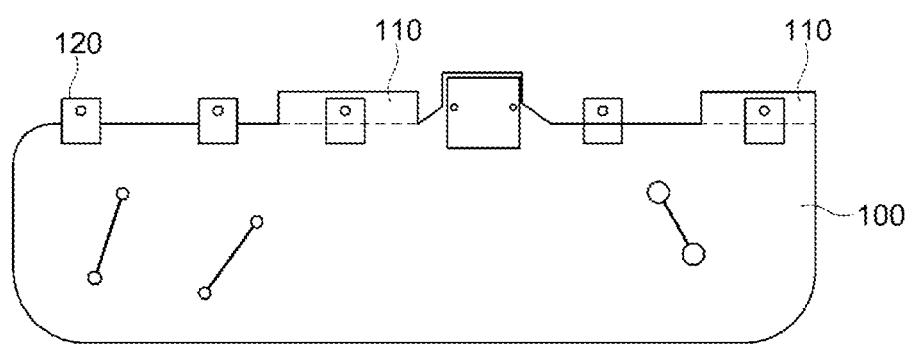
FIG. 4 is a view showing the unfolded curtain airbag cushion and a ramp pattern in the curtain airbag module according to the embodiment of the present invention.

FIG. 2 is a sectional view showing the installation state of a curtain airbag module according to the embodiment of the present invention, FIG. 3 is a sectional view showing the installation state of a curtain airbag cushion of FIG. 2, FIG. 4 is a view showing the unfolded curtain airbag cushion and a ramp pattern in the curtain airbag module according to the embodiment of the present invention, and FIGS. 5(a) to 5(c) are side sectional views sequentially showing a procedure of winding the ramp pattern around the curtain airbag cushion while folding the curtain airbag cushion in the curtain airbag module according to the embodiment of the present invention.

In the curtain airbag module according to an exemplary embodiment of the present invention, when the curtain airbag cushion is deployed, the curtain airbag cushion can be prevented from being inserted into a pillar trim of a vehicle, so that the curtain airbag cushion can be stably deployed into the interior space of the vehicle, thereby safely protecting an occupant.

As shown in FIGS. 2 and 3, the curtain airbag module includes a curtain airbag cushion 100 and an inflator 200 to supply gas into the curtain airbag cushion 100 to inflate the curtain airbag cushion 100.

In this case, a lower end portion and a rear surface part of the curtain airbag cushion 100 are supported by a ramp bracket 300 fixedly mounted on a vehicle panel. The ramp bracket 300, which is an injection molded member or a pressed member, may be mounted on the vehicle panel through a typical screw mount work.

According to the present embodiment, as shown in FIG. 4, a ramp pattern 110 is integrally provided with the curtain airbag cushion 100.

The ramp pattern 110 is a component to guide the deployment direction of the curtain airbag cushion 100 so that the curtain airbag cushion 100 can be deployed into the interior space of the vehicle without being deployed into a pillar trim 410 of a vehicle when the curtain airbag cushion 100 is deployed by driving the inflator 200.

As shown in FIG. 4, in the state of the curtain airbag cushion 100 is unfolded, the ramp pattern 110 is provided at an upper end portion of the curtain airbag cushion 100. In addition, the curtain airbag cushion 100 is provided at the upper end portion thereof with a cushion tab 120 to fix one side of the curtain airbag cushion 100 onto the vehicle panel and the ramp bracket 300. After the cushion tap 120 has been fabricated separately from the curtain airbag cushion 100, the cushion tab 120 is coupled with the curtain airbag cushion 100 through a sewing work. In addition, the cushion tab 120 is fixed onto the vehicle panel and the ramp bracket 300 through a screw mount work.

Meanwhile, according to the present embodiment, the ramp pattern 110 includes a fabric material the same as that of the curtain airbag cushion 100.

For example, when the curtain airbag cushion 100 is woven through an OPW (One Piece Woven) scheme, the ramp pattern 110 is formed simultaneously with the curtain airbag cushion 100 when the OPW scheme used to fabricate the curtain airbag cushion 100 is performed. The ramp pattern 110 is integrally formed with the curtain airbag cushion 100 without an additional sewing process. In this case, more preferably, the ramp pattern 110 includes a fabric material having strength superior to that of the curtain airbag cushion 100. In addition, the ramp pattern 110 may be made of various fabric materials.

Accordingly, as shown in FIG. 3, when the curtain airbag cushion 100 is deployed, after the ramp pattern 110 has been rotated downwardly due to the deployment pressure of the curtain airbag cushion 100, the ramp pattern 110 is positioned between the curtain airbag cushion 100 and the pillar trim 410 to cover an upper portion of the pillar trim 410, thereby preventing the curtain airbag cushion 100 from being inserted into the inside the pillar trim 410 of the vehicle. In this case, the ramp pattern 110 is integrally formed with the curtain airbag cushion 100 so that the gas generated in the explosion of the inflator 200 is not introduced into the ramp pattern 110. For example, an additional gas barrier film may be provided or sewn on the connection part between the ramp pattern 110 and the curtain airbag cushion 100.

According to another embodiment, when the curtain airbag cushion 100 is formed by sewing two panels, the ramp pattern 110 may be simultaneously formed when two panels are cut out. Alternatively, after the ramp pattern 110 has been separately fabricated from the curtain airbag cushion 100, the ramp pattern 110 may be coupled with the curtain airbag cushion 100 through a sewing work.

Hereinafter, the folding procedure of the curtain airbag cushion 100 and the ramp pattern 110 will be described in brief.

Figure 5:
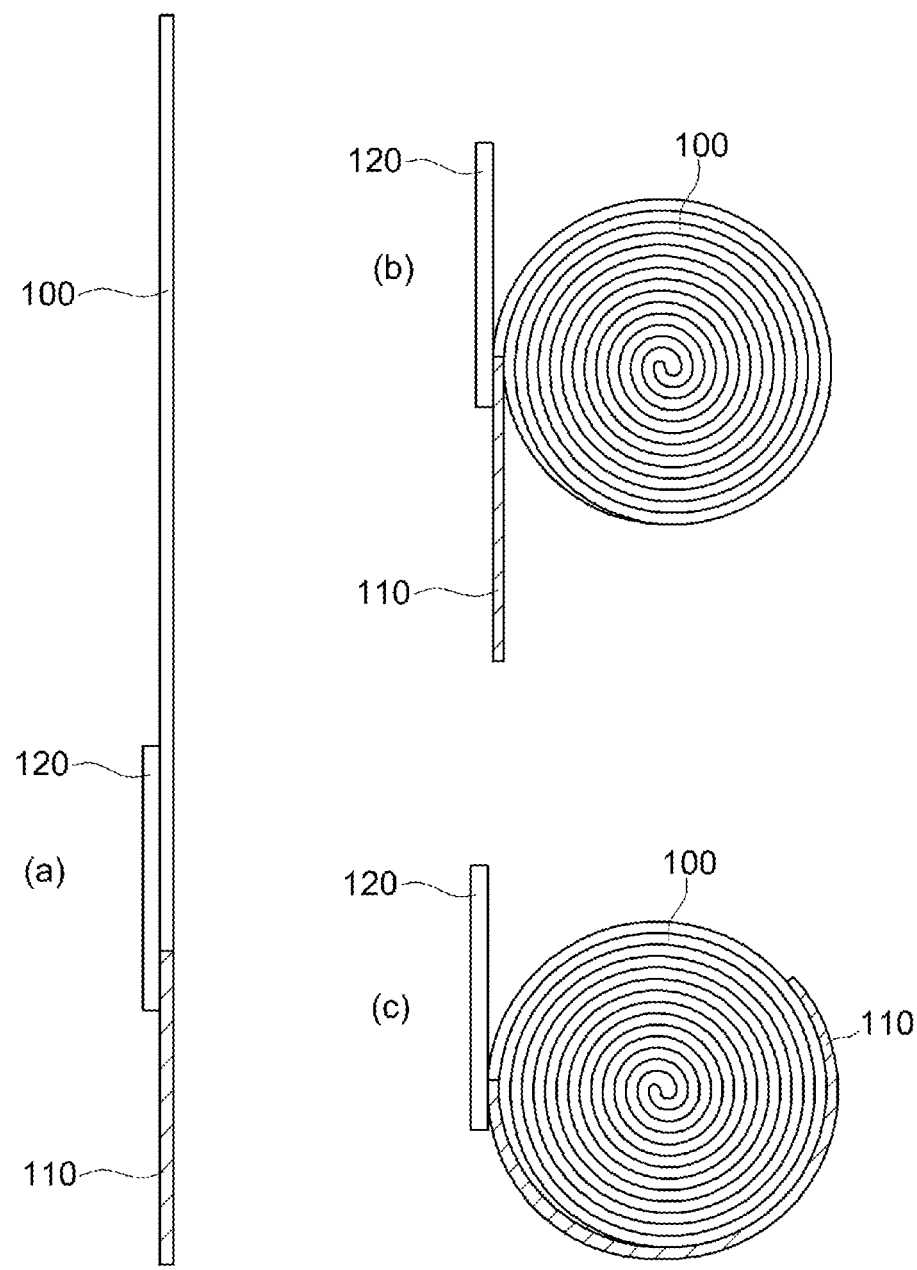
FIGS. 5(a) to 5(c) are side sectional views sequentially showing a procedure of winding the ramp pattern around the curtain airbag cushion while folding the curtain airbag cushion in the curtain airbag module according to the embodiment of the present invention.

As shown in FIG. 4, the curtain airbag cushion 100 in the unfolded state is folded clockwise as shown in FIG. 5(*a*). In this state, the ramp pattern 110 is rotated counterclockwise to wrap up the folded curtain airbag cushion 100 as shown in FIG. 5(*c*).

According to the present embodiment, as shown in FIG. 4, since ramp patterns 110 are spaced apart from each other lengthwise (horizontal direction) of the curtain airbag cushion 100, the ramp patterns 110 wrap up at least a portion of the folded curtain airbag cushion 100. However, the present invention is not limited thereto. In other words, at least three ramp patterns 110 may be provided lengthwise of the curtain airbag cushion 100.

Thereafter, the end portion of the ramp pattern 110 is taped with respect to the surface of the folded curtain airbag cushion 100, so that the curtain airbag cushion 100 can be maintained in the folded state. In the state that the folded curtain airbag cushion 100 is supported on the ramp bracket 300, the folded curtain airbag cushion 100 is mounted on the vehicle panel through a screw mount work.

Thereafter, as shown in FIG. 3, when the curtain airbag cushion 100 is deployed due to vehicle collision, the taped part is torn or is out of the place thereof, so that the ramp pattern 110 is interposed between the curtain airbag cushion 100 and the pillar trim 410 due to the deployment pressure of the curtain airbag cushion 100. Accordingly, the ramp pattern 110 guides the deployment of the curtain airbag cushion 100 into the vehicle interior. Reference numeral 400, which is not described, denotes a headlining.

In this case, preferably, the length of the ramp pattern 110 wrapping up the folded curtain airbag cushion 100, that is, the length of the ramp pattern 110 in a circumferential direction of the folded curtain airbag cushion 100 has a sufficient value so that the curtain airbag cushion 100 is not inserted into the inside of the pillar trim 410, in detail, the ramp pattern 110 is interposed between the curtain airbag cushion 100 and the pillar trim 410 due to the deployment pressure of the curtain airbag cushion 100 to cover the upper portion of the pillar trim 410 of the vehicle.

In summary, according to the present embodiment, since the ramp pattern 110 is made of the fabric material the same as that of the curtain airbag cushion 100, and formed simultaneously with the curtain airbag cushion 100 in the process for the curtain airbag cushion 100, the manufacturing cost can be reduced.

In addition, according to the related art, a bracket having a complex structure is constructed for the purpose of preventing the curtain airbag cushion 100 from being deployed into the inside of the pillar trim of the vehicle. However, the internal space of the headlining is narrowed, and the manufacturing cost is inevitably increased due to the complex structure of the bracket. In contrast, according to the present embodiment, since the ramp pattern 110 includes a fabric material integrally formed with the curtain airbag cushion 100, and the deployment of the curtain airbag cushion 100 into the interior of the vehicle is guided by the ramp pattern 110, the deployment direction of the curtain airbag cushion 100 can be more sufficiently guided in the simpler structure when comparing with the related art.

In addition, the ramp pattern 110 to guide the deployment direction of the curtain airbag cushion 100 includes a fabric material and wraps up the folded curtain airbag cushion 100, so that the volume of the ramp pattern 110 is reduced. Accordingly, the ramp pattern 110 can be easily installed in the narrow space formed inside the headlining, and the deformation of the ramp pattern 110 caused by external impact can be minimized.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The invention claimed is:

1. A curtain airbag module comprising:
a curtain airbag cushion;
an inflator for supplying gas into the curtain airbag cushion to inflate the curtain airbag cushion; and
a ramp bracket fixedly mounted on a vehicle panel to support the curtain airbag cushion,
wherein the curtain airbag cushion integrally includes a ramp pattern to guide a deployment direction of the curtain airbag cushion to prevent the curtain airbag cushion from being deployed into a pillar trim of a vehicle when the curtain airbag cushion is deployed by driving the inflator, the ramp pattern wrapping up at least a portion of the curtain airbag cushion in a folded state, and
wherein the ramp pattern is supported by the ramp bracket in a vertical direction when the curtain airbag cushion is in an expanded state such that the ramp pattern directs the curtain airbag cushion away from the vehicle panel in a horizontal direction;
wherein the ramp bracket includes a horizontally extending portion and upon deployment of the curtain airbag cushion the ramp pattern includes a first end mounted to the vehicle panel horizontally above the ramp bracket and a second end horizontally beyond a distal end of the horizontally extending portion and vertically below the horizontally extending portion.

2. The curtain airbag module of claim 1, wherein the ramp pattern includes a fabric material identical to a fabric material of the curtain airbag cushion.

3. The curtain airbag module of claim 1, wherein the ramp pattern includes a fabric material having strength superior to a fabric material of the curtain airbag cushion.

4. The curtain airbag module of claim 1, wherein, when the curtain airbag cushion is deployed, the ramp pattern is positioned between the curtain airbag cushion and the pillar trim of the vehicle due to a deployment pressure of the curtain airbag cushion to cover an upper portion of the pillar trim of the vehicle, thereby guiding deployment of the curtain airbag cushion into an interior space of the vehicle.

5. A curtain airbag module comprising:
a curtain airbag cushion;
an inflator for supplying gas into the curtain airbag cushion to inflate the curtain airbag cushion; and
a ramp bracket fixedly mounted on a vehicle panel to support the curtain airbag cushion,
wherein the curtain airbag cushion integrally includes a ramp pattern to guide a deployment direction of the curtain airbag cushion to prevent the curtain airbag cushion from being deployed into a pillar trim of a vehicle when the curtain airbag cushion is deployed by driving the inflator, the ramp pattern woven with the curtain airbag cushion, the ramp pattern wrapping up at least a portion of the curtain airbag cushion in a folded state, wherein the ramp pattern is supported by the ramp bracket in a vertical direction when the curtain airbag is in an expanded state such that the ramp pattern directs the curtain airbag cushion away from the vehicle panel in a horizontal direction;

wherein the ramp bracket includes a horizontally extending portion, and wherein upon deployment of the curtain airbag cushion the ramp pattern includes a first end mounted to the vehicle panel horizontal above the ramp bracket and a second end horizontally beyond a distal end of the horizontally extending portion and vertically below the horizontally extending portion.

6. The curtain airbag module of claim 5, wherein the ramp pattern includes a fabric material identical to a fabric material of the curtain airbag cushion.

7. The curtain airbag module of claim 5, wherein the ramp pattern includes a fabric material having strength superior to a fabric material of the curtain airbag cushion.

8. The curtain airbag module of claim 5, wherein, when the curtain airbag cushion is deployed, the ramp pattern is positioned between the curtain airbag cushion and the pillar trim of the vehicle due to a deployment pressure of the curtain airbag cushion to cover an upper portion of the pillar trim of the vehicle, thereby guiding deployment of the curtain airbag cushion into an interior space of the vehicle.

* * * * *